Feb. 26, 1935.  B. BEARDSLEY ET AL  1,992,349
BELT CONVEYER
Filed Dec. 31, 1931  2 Sheets-Sheet 1
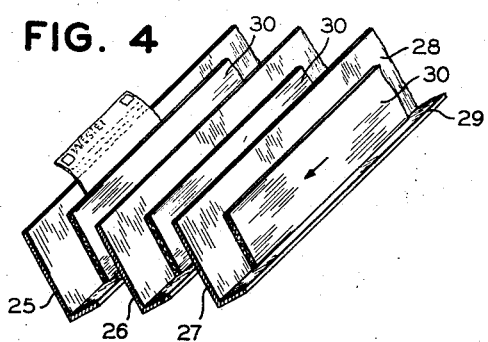
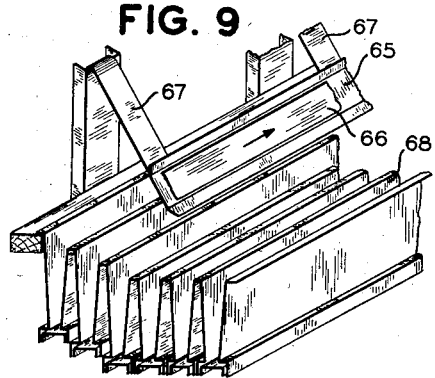
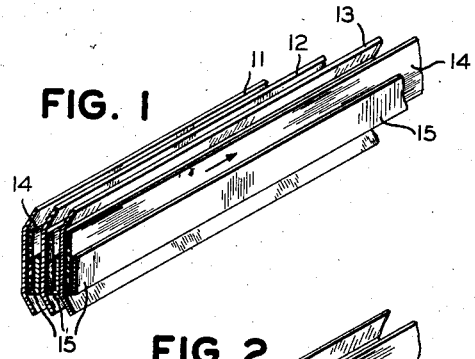
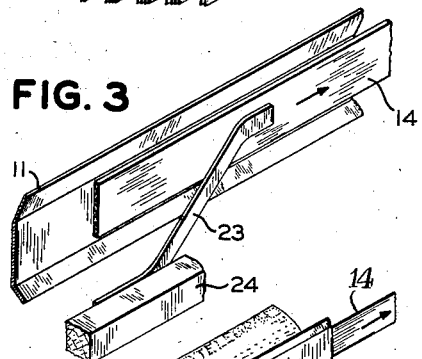
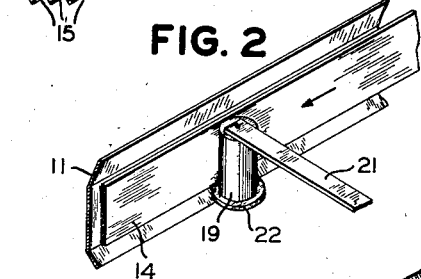
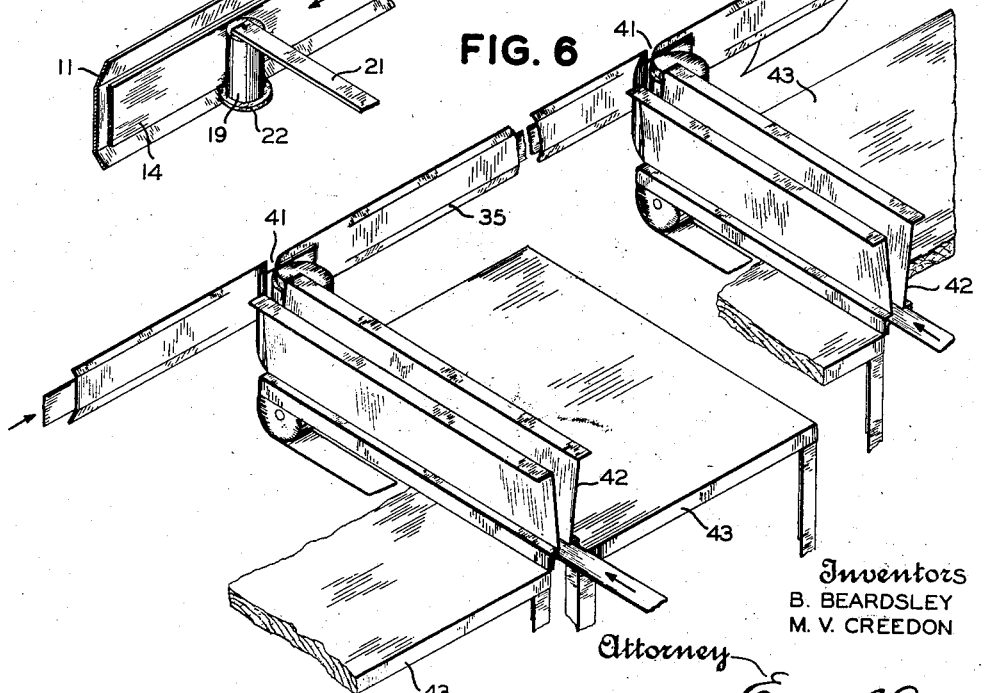
Inventors
B. BEARDSLEY
M. V. CREEDON
Attorney
Eugene C. Brown Feb. 26, 1935. B. BEARDSLEY ET AL 1,992,349
BELT CONVEYER
Filed Dec. 31, 1931 2 Sheets-Sheet 2

Inventors
B. BEARDSLEY
M. V. CREEDON
By their Attorney
Eugene C. Brown

Patented Feb. 26, 1935

1,992,349

UNITED STATES PATENT OFFICE 1,992,349

BELT CONVEYER

Bruce Beardsley, Brooklyn, N. Y., and Michael V. Creedon, Westfield, N. J., assignors to The Western Union Telegraph Company, New York, N. Y., a corporation of New York Application December 31, 1931, Serial No. 584,204

5 Claims. (Cl. 198—160)

This invention relates to conveyer systems for handling sheet material such as telegram blanks, messages and the like, more particularly to systems employing conveyers of the drag type arranged to transport sheets of material in a substantially on-edge or upright position.

A particular object of this invention is to provide means for effectively supporting the conveyer belts and maintaining the same in proper relation with the conveying surface of the channel of drag type conveyers when they are disposed substantially in an on-edge position.

Another object is to employ a drag conveyer for transporting sheets of material in an upright position with one edge of the sheets riding free or exposed beyond the conveyer channel, whereby the sheets may be easily grasped and withdrawn from the conveyer.

Still another object is to accomplish a more compact arrangement of conveyers for sheet material by disposing the conveyers in an on-edge position and by grouping the conveyer channels parallel to each other in substantially nested relation.

A further object is to provide a special type of drag channel adapted particularly to be disposed in an on-edge position.

A still further object is to provide a system of conveyers including conveyers for feeding material into the on-edge drag conveyers and other conveyers arranged to receive material withdrawn from the drag conveyers.

These and other objects are effected by my invention as will be apparent from the following description and claims taken in connection with the accompanying drawings forming a part of this application, in which:

Fig. 1 is a detail view showing a group of channels arranged on edge in nested relation, such as employed in Fig. 5 below;

Figs. 2 and 3 are detail views showing other means than shown in Fig. 1 for supporting the conveyer belt;

Fig. 4 is a detail view showing a special type of drag conveyer channel, such as employed in the arrangement of Fig. 7 below, which is particularly adapted to be disposed in on-edge position, also a nested group of channels of this type;

Fig. 6 is a view supplementing Fig. 5 and showing the collecting conveyers arranged at the backs of parallel rows of work tables;

Fig. 9 is a view of a feeding conveyer disposed above the distribution conveyers.

Figure 8:
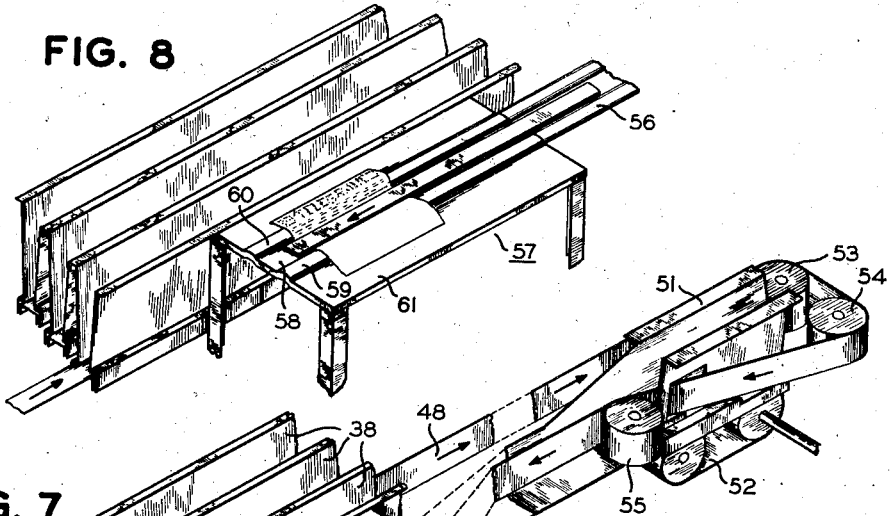
Fig. 8 is a view of a drag conveyer disposed horizontally at a distribution center, the conveyer channel being embodied in the work table top.

Heretofore when it has been desired to convey sheets of material, such as telegram blanks and the like, in an upright position with one edge free, conveyers of the V trough type have been employed. In this type of conveyer a relatively narrow channel or pathway is formed between spaced side members and a conveyer belt travels along the bottom of the channel. Message blanks may be dropped into or removed from the channel along the open top edge. They are carried along the channel by means of a traveling belt. According to this invention the drag type of conveyer in which messages are carried between a belt and the surface of a longitudinally extending channel or guideway, along which the belt travels by frictional engagement with the belt, has been adapted to carry message blanks in an upright or on-edge position. The message may be placed in the conveyer so that one edge projects out beyond the edge of the conveyer channel and belt, enabling the message to be readily grasped and removed from the conveyer by pulling it from between the belt and the channel. The belt and channel is of less width than the width of the message blanks so that only a portion of the message blanks is engaged between the belt and the conveyer channel.

It has been found that a drag type conveyer disposed in an on-edge position has many advantages over the V trough type in a system for handling sheets or message blanks, particularly for receiving messages from other conveyers and for conveying them to the so-called distribution center where they are assorted and rerouted to desired destinations. One advantage is that when a message is inserted in a drag conveyer it is gripped by the conveyer and remains substantially in the same position as when it enters the conveyer system. This will enable the messages to be placed in a definite position, for example, with the address or other markings on the message in full view, so that upon arrival at the distribution center the messages may be readily withdrawn from the conveyers by assorting and rerouting clerks. Ordinarily, only one flat belt may be conveniently employed at the distribution center. This is because the conveyer feeding the messages into the distribution center is disposed between the assorting clerks and the outgoing or distribution conveyers, and therefore the amount of space occupied by the feeding conveyers determines largely the number of distribution conveyers that may be placed in easy reach of the assorting clerks beyond the feeding conveyers. Not only does the use of the compact drag type conveyer disposed on-edge enable a larger number of distributing conveyers to be employed but the drag conveyers themselves may be disposed close together in a nested arrangement, thereby making it possible to feed into the distribution center from a plurality of feeding conveyers.

Another advantage of the drag type over the V trough type of conveyer is that it can be operated at a substantially higher rate of speed than the V trough or open type.

Referring now to the drawings, Fig. 1 illustrates in detail a number of drag conveyers with their channels disposed in an on-edge position and arranged close together in nested relation. The arrangement comprises channel members 11, 12 and 13 extending longitudinally in the same direction and spaced from each other. Each of the channels comprises a longitudinally extending flat central portion having joined thereto, along its edges, outwardly flaring side portions disposed preferably at a relatively small angle to the central portion. A belt 14 corresponding to each channel is disposed on edge and arranged to travel in substantial engagement with the surface of the central portion of each channel member. Each of the belts 14 is supported by a suitable angle member 15, the lower leg of the angle member being arranged to provide a supporting guide along the lower edge of the belt. The upper leg of the angle is relatively wide and extends along the outer face of the belt for holding the belt in proper conveying relation to the channel. Each of the guide angles 15 is supported independently of its corresponding channel member and suitably spaced therefrom for permitting the belt to travel freely in the channel or slot embodied between the guide member and the corresponding conveyer channel member. The guide member is entirely free from the channel member and the lower leg is slightly spaced away from the face of the channel member to enable sheets of material being conveyed between the face of the channel member and the conveying surface of the belt to travel freely between the guide member and the channel member. The sheets of material are carried along the channel member by frictional engagement between the sheets and the belt, the coefficient of friction between the sheets and the belt being considerably larger than that between the sheets and the channel. This causes the sheets to be carried along with the belt as it travels in substantial engagement with the channel. The outwardly flaring side portions of the channel cause the edge of the sheets to be bent outwardly from the plane of the central portion. By reason of the sheets being thus caused to assume a non-planiform shape they will be maintained in substantially constant engagement with the belt, even though the belt, due to irregularities in the shape of the channel member, is not maintained at all times in engagement with the central portion of the channel member. The action of the drag conveyer in this respect is substantially the same as that described in Patent No. 1,793,953, granted February 24, 1931 to F. E. d'Humy, et al.

When a number of conveyer channels are disposed in nested relations, as shown in Fig. 1, the belt guide member 15 for the first channel 13 may be supported by any suitable means which will hold it in proper relation to the channel member. The guide members for the remaining conveyer channels are preferably supported on the backs of the adjacent channels. In this manner an exceedingly compact arrangement of a plurality of conveyers for sheet material is obtained by a very simple and rugged construction. When this is compared with the types of conveyers heretofore employed for transporting sheet material in an upright position, it is readily seen that considerable saving of space is accomplished.

Referring to Fig. 2, another method of supporting the conveyer belt, when the channel is arranged in an on-edge position, is illustrated. Instead of the continuous guide member 15 illustrated in Fig. 1, a plurality of roller members 19 may be employed. Only one such member is illustrated but it is obvious that any desired number may be employed with any suitable spacing between adjacent rollers. Each of the rollers is supported by a suitable bracket structure 21. The body of the roller 19 holds the belt in substantial engagement with the central portion of the face of the channel 11, while a flange 22 at the lower end of the body portion engages the lower edge of the belt 14 to provide a horizontal support for maintaining the belt in proper horizontal alinement with the channel.

Fig. 3 illustrates another means of maintaining the belt in suitable conveying relation to the guide channel when disposed in an one-edge position. When the lengths of conveyer channel between direction changing rollers are relatively short, the belt will be supported between the rollers due to the tension in the belt. In such cases horizontal belt supporting means between the rollers may be omitted. Suitable lateral support may be had for maintaining the belt in suitable engagement with the surface of the conveying channel by merely providing suitably arranged spring or resilient members 23 engaging the outer surface of the belt and pressing the same lightly against the conveying surface of the channel. The spring members, suitably spaced longitudinally of the belt and supported on any suitable structure such as a bar 24, provide the desired belt guide means under the above conditions.

It will be observed that the conveyer channel members as just described are substantially symmetrical in cross section and arranged to convey the sheets with both the upper and lower edges extending out beyond the conveyer channel. However, a channel may be employed which permits the sheets to extend outward only along the upper edge of the channel. Such a type of channel member is illustrated in Fig. 4, which shows a group of said channels arranged together. The group comprises channel members 25, 26 and 27 arranged back to back and disposed closely adjacent each other. Each channel comprises a longitudinally extending L shaped member embodying an upwardly extending back portion 28 and an outwardly extending leg portion 29. A conveyer belt 30 is arranged to travel along the channel with its inner surface substantially in engagement with the back portion and its lower edge supported by the leg portion. In other words, the back portion provides the conveying surface of the channel member while the leg portion provides the supporting guide for the lower edge of the belt. Sheets of material are inserted between the belt and the back portion of the channel and are carried along the channel by a frictional engagement with the belt. The lower edges of the sheets ride along the guiding surface of the leg portion substantially in the same manner as the conveyer belt. Several channel members may be disposed parallel to each other as illustrated in Fig. 4, with the leg portions of the channels 26 and 27 engaging the back of the adjacent channels 25 and 26 respectively. In the preferred arrangement the channels are inclined backwardly so that the weight of the belt will provide the slight engagement with the conveying surface of the channel required for suitably conveying the sheets along the channel without the necessity of springs or other guide members to hold the belt in place. This arrangement is greatly simplified when compared to Fig. 1. However, the channels may be disposed in a vertical position and springs or other suitable guide members disposed in proper position for maintaining the belt in substantial engagement with the conveyer surface.

As already set forth one of the particular advantages of the drag conveyer on edge for transporting messages resides in the fact that the upper edges of the message blanks are exposed and the addresses or other suitable identifications on the messages or telegrams may be read at a glance and assorting of the telegrams may be accomplished by clerks who sit at work tables or other supporting structure along which the conveyer extends and who withdraw the telegrams and messages from the conveyer as they travel past their position. All that is required to make this possible is that the telegram blanks be inserted or fed into the conveyer with the address edge of the blank exposed above the conveyer. The blanks, being once placed into the conveyer in the proper position, will retain that position throughout the length of the drag conveyer run.

Figure 5:
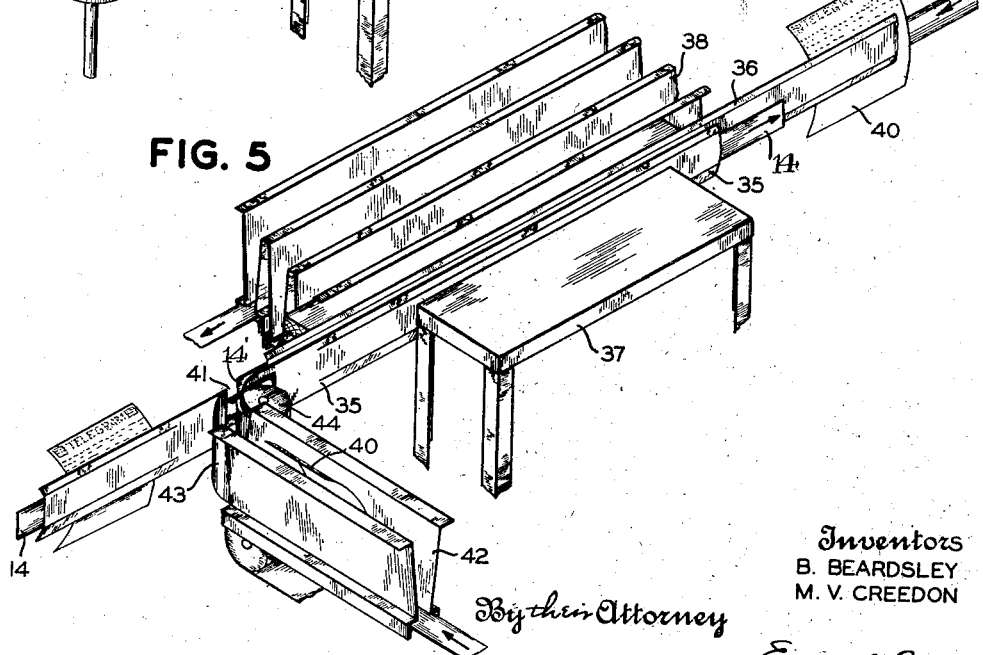
Fig. 5 is a view showing a part of a system comprising two pick-up drag conveyers arranged as feeding conveyers at the back of the work table of the distribution center, a collecting conveyer discharging into one of the conveyers, and a group of distributing conveyers for receiving material withdrawn from the drag conveyers.

A suitable arrangement for employing the drag conveyer in an on-edge position for accomplishing the above results is illustrated in Fig. 5. The arrangement comprises two drag conveyers 35 and 36 of the type shown in Fig. 1 disposed in nested relation and arranged to extend along the back of the work table 37 or otherwise suitably disposed in front of one or more assorting clerks. These conveyers are provided with belts 14 and 14' arranged to travel in opposite directions as illustrated. If preferred they may travel in the same direction. Such an arrangement is ordinarily known in the art as a distribution center. The material is picked up by these conveyers and fed into the distribution center and passed before assorting clerks, who are familiar with the destination of telegrams having certain addresses. The clerks upon observing the telegram blanks passing before them with those addresses remove the same from the conveyers in which the messages arrive, ordinarily referred to as feeding conveyers, in connection with the distribution center and drop the messages into V-trough or other suitable distributing conveyers disposed behind the work table and beyond the feeding conveyers. In Fig. 5, V-trough conveyers 38 represent the distributing conveyers. From these conveyers the messages are carried to their destination from whence they are dispatched by retransmission or delivery as the occasion requires.

It is to be understood that the number of feeding conveyers for bringing the messages to the distribution center is not limited to the two conveyers 35 and 36 shown. Several others may be suitably disposed between the distributing conveyers and the assorting clerks without crowding the space due to the fact that each conveyer in on-edge position occupies an extremely small amount of space. The feeding conveyers may be suitably arranged to extend in any direction to connect with other conveyers or collect material from a given area or point.

A suitable means for transferring the messages 40 in the drag pick-up conveyers 35 and 36 may be provided by forming a slot or feed-in opening in the conveyer channel, such as the opening 41. Messages may be fed into this opening by hand, observing to hold the message with the address edge up and suitably exposed above the conveyer channel, or the messages may be discharged into the slot from an adjacently disposed conveyer provided with suitable discharge guide means. In the illustration, a V-trough type conveyer 42 is disposed to feed into the slot or opening 41 through suitable guide members 43 and 44 disposed to direct the messages into the slot. The conveyer 42 is shown as disposed at substantially right angles to the drag conveyer 35 and at a suitable elevation to discharge the message blanks with the proper amount of the upper edge exposed above the conveyer channel 35. If messages are collected by conveyer 42 by being inserted into the channel of the V-trough with the address edge up and with the message faced in the proper direction, the address side of the message wil be toward the assorting clerks as it passes the distribution center. In the arrangement shown in the illustration this would be with the message faced toward the right as it proceeds along the line of travel. As the message reaches the end of the collecting conveyer it is guided into the pick-up conveyer 35 by a guide plate 43 at one side of the slot 41 and a roller 44 on the other side disposed to rotate in engagement with the conveyer belt 14. As the message enters the slot 41, the forward edge is engaged between the roller 44 and the belt 14 and carried forward along the channel 35 of the drag conveyer. The arrangement may be suitably modified to adopt it to other types of conveyers such as that illustrated in Fig. 4. In addition, types of pick-up or collecting conveyers other than those shown may be employed.

The pick-up or feeding conveyers 35 and 36 may be extended horizontally in any direction to receive material from any desired number of other conveyers. In Fig. 6 is shown an arrangement of a plurality of V-trough type conveyers 42 arranged at the back of substantially parallel rows of work tables 43. The rows of work tables may be single with the conveyers along the center or they may be arranged as illustrated in double rows. In this arrangement the V-trough conveyers serve to collect the messages from telegraph machines or other means of origination along the tables. The operators deposit the messages in the V-trough conveyers with the address edge up suitably faced as already described. From the discharge of these conveyers the messages are received or picked up by the drag conveyer 35, arranged on edge and provided with suitable feeding slots 41 adjacent the ends of the respective collecting conveyers.

Conveyer 35 in Fig. 6 is an extension of conveyer 35 of Fig. 5. Taken together, Figs. 5 and 6 diagrammatically represent a complete system. Conveyer 36 may likewise be extended to connect with one or more collecting conveyers.

Figure 7:
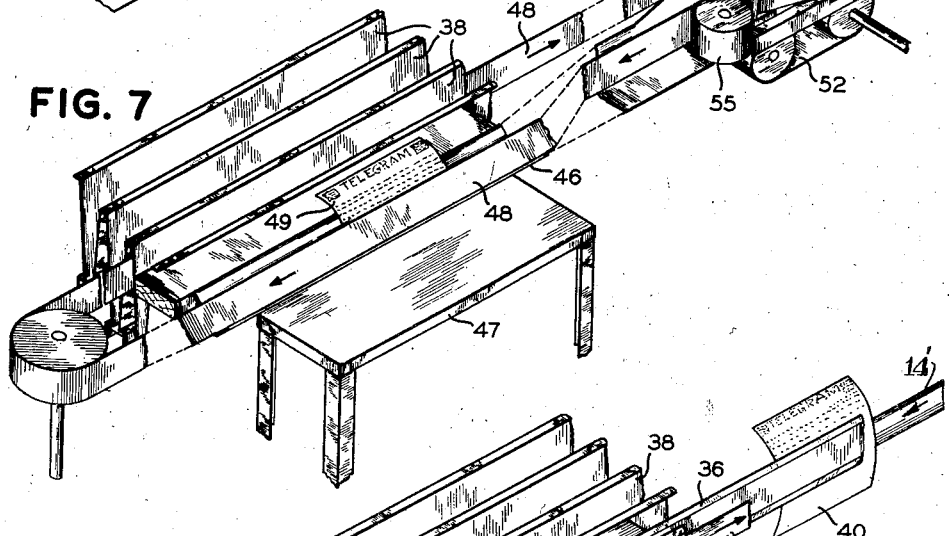
Fig. 7 is a view of the special type of drag conveyer channel, illustrated in detail in Fig. 4 employed at a distribution center and a feed from another conveyer disposed in an in-line position with the drag conveyer.

Fig. 7 shows an arrangement at the distribution center in which a feeding conveyer of the type shown in Fig. 4 is employed. The feeding conveyer channel 46 is arranged with its back away from the rear edge of the table 47 so that as the conveyer belt 48 travels on the inner side of the channel nearest the table a message blank 49 with its address faced toward the belt will be in position to be read by an assorting clerk working at the table. In the rear of the feeding conveyer are a number of distribution conveyers of the V-trough type in which the telegram blanks are dropped by the assorting clerk after they are removed from the feeding conveyer. From the distribution conveyers they are transported to the proper destination. By a suitable arrangement of the belt guide rollers several feeding conveyer channels 46 may be located at the back of the table. They could be arranged in nested relation substantially as shown in Fig. 4.

At the right of the distribution center illustrated in Fig. 7 is a special arrangement for feeding message blanks into the conveyer channel 46. The channel member is extended at one end and connected to one side of a V-trough conveyer 51. The V-trough conveyer channel may be of any desired length. However, only a relatively short length is illustrated. The V-trough conveyer channel 51 is provided with a conveyer belt 52 arranged to travel along the bottom of the channel in a well known manner. The channel is open at the top so that message blanks may be dropped into the same and be carried forward by the travelling belt 52. The belt 48 of the feeding conveyer is arranged by means of guide rollers 53, 54 and 55 to extend through one side of the V-trough channel and across the channel and forward along the other side to a point substantially in engagement with the side. As already stated, this side of the V-channel is connected directly to the feeding conveyer channel 46, or in other words, forms a continuous element therewith. The conveyer belt 48 is supported horizontally along its lower edge by the outwardly extending portion of the channel member 46. Message blanks deposited into the open section of the V-trough 51 are carried forward until they engage the portion of the belt 48 as it passes across the end of the channel and around the guide roller 55. When the blanks reach the guide roller they will be brought over to the extended side of the channel and will be held against the conveyer belt 48 due to its contact with the side of the channel, causing the sheets to be conveyed forward as in any other portion of a drag conveyer. Other provisions may be made, however, for feeding material into this type of drag channel. The types of feed-in described in connection with the other type of drag channel herein set forth, may be suitably modified to feed into this type of channel also.

Fig. 8 shows another type of conveyer arrangement employing a drag conveyer 56 to feed the messages into a distribution center. In this arrangement the drag conveyer instead of being disposed in an on-edge position is arranged in the usual flat position, that is, with the conveyer channel horizontal instead of substantially vertical. The type of drag conveyer employed embodies the outwardly flaring side portions joined to the central portion along which the belt travels. This arrangement carries the blanks with the edges overhanging the sides of the conveyer channel. The edges of the sheets ordinarily extend upward from the edge of the conveyer channel and in this manner may be readily grasped and removed from the conveyer in much the same way as when the conveyer is disposed in an on-edge position. The portion of the conveyer channel extending along the distribution or assorting work table is shown as embodied in the surface of the table instead of the channel member being a separate element supported on the table. The portion of the channel in the table comprises a central element 58 and a pair of lateral elements 59 and 60. These elements may be formed in the table top by raising beads at the proper distance apart in the table top 61, particularly if the table is of sheet metal. However, the channel may be formed in any other suitable manner such as by securing bead moulding on the table. This arrangement provides a smoother working surface than could be provided if the conveyer channel were a separate structure. It is understood, however, that a separate channel structure may be employed if desirable. The portions of the conveyer extending beyond the table top 61 may be formed of channel elements similar to the channel 11 illustrated in Fig. 1 disposed with its transverse section horizontal.

Fig. 9 shows still another arrangement of the feeding conveyer with respect to the distribution conveyers. In this arrangement the feeding conveyer comprises a conveyer channel 65 of the drag type and a belt 66 travelling in the channel. The conveyer is supported, in this case, above a group of distribution conveyers by suitable brackets 67 or other suitable means. The assorting clerks will be seated in front of the group of distribution conveyers and the message blanks are removed from the feeding conveyer by withdrawing them downwardly from between the channel 65 and the belt 66 instead of upwardly as in the other arrangement illustrated herein. A nested group of feeding conveyers may be employed in this arrangement instead of a single conveyer as illustrated.

With the arrangement just described, a larger number of distribution conveyers may be employed for the reason that the work table has been omitted and the feeding conveyer supported otherwise. The omission of the work table makes it possible to locate this larger number of distribution conveyers within easy reach of the assorting clerks. When the feeding conveyers bring the message blanks in with the addresses readily visible, there is little need for a work table surface to accomplish the assorting. The message blanks can be withdrawn one by one from the feeding conveyer and deposited immediately in the proper distribution conveyer without having to lay the blanks upon a work surface to disentangle the same. From this it will be seen that the capacity of the distribution center may clearly increase without any complication of the arrangement of the apparatus.

From the foregoing description it will be observed that a conveyer system for the collection and distribution of sheet material such as messages or telegram blanks has been provided in which the messages are transported quickly and in definite order to the distribution center and in which the arrangement of the distribution center permits the handling of the maximum amount of messages in a given space. Also it will be observed that a message distribution center has been provided employing a plurality of conveyers feeding messages into the center instead of one conveyer as heretofore. It will further be observed that the novel type of drag conveyer channel is especially adapted to be employed as a feeding conveyer in connection with a distribution center.

Although we have shown our invention in several forms it will be obvious to those skilled in the art that it is not limited to the forms described but is susceptible to various other changes and modifications without departing from the spirit thereof, and we desire therefore that only such limitations shall be placed thereon as are imposed by the prior art or as are specifically set forth in the appended claims.

What we claim is:

1. In a conveyer for sheet material the combination of a drag channel disposed in a substantially on-edge position, a belt traveling in engagement with said channel, said channel embodying a central portion and adjoining outwardly flaring side portions for providing a surface over which sheets of material travel, and means in engagement with the outer surface of the belt and the lower edge thereof for supporting the belt and maintaining the same in conveying relation to said channel, said conveyer being arranged to engage the sheets below their top edge portions whereby said edge travels free in an upstanding position.

2. In a conveyer system the combination of a plurality of longitudinally extending conveyers comprising a plurality of belts with lateral supporting means and a like number of conveyer channel members embodying a central portion and adjoining outwardly flaring side portions, said belts being arranged to travel substantially in contact with the central portion of their respective channels, said channel members being disposed adjacent to each other in nested relation and spaced apart to admit the belts and supporting means therefor.

3. In a conveyer system the combination of a plurality of longitudinally extending conveyers comprising a plurality of belts and a like number of conveyer channel members embodying a central portion and adjoining outwardly flaring side portions, said belts being arranged to travel substantially in contact with the central portion of their respective channels, said channel members being disposed adjacent to each other in nested relation and spaced apart to admit the belts and guide members for the belts, said guide members being secured to the back of the adjacent channel member.

4. In a conveyer for sheet material, a drag channel disposed in a substantially on edge position and embodying a main conveying surface and an adjoining outwardly flaring side portion disposed at a slight angle to the main surface along the lower edge thereof to provide a conveyer path along which sheets of material may travel with their edges extended transversely beyond said channel, a belt disposed in a substantially on edge position and arranged to travel along the main surface of said channel so as to hold sheets flat against the channel with a crease substantially at the point where the main surface of the channel and the outwardly flaring surface adjoin, and means for maintaining the belt substantially in continuous engagement with the main surface so that the lower outwardly adjoining surface engages the lower crease of the sheet and acts as a longitudinally extending support therefor preventing the sheets being displaced downwardly in their travel along the conveyer.

5. In a conveyer system the combination of a plurality of longitudinally extending conveyers comprising a plurality of belts and a like number of conveyer path forming members embodying a central surface in contact with which the respective belts travel for conveying sheet material between them and the respective surface and lateral surfaces flaring outwardly at an angle to said central surface, said path forming members being disposed adjacent each other in nested relation and spaced apart to admit the belts and the material being conveyed.

BRUCE BEARDSLEY.
MICHAEL V. CREEDON.